Oct. 27, 1925.
P. G. BURDINE
SHOCK ABSORBER
Filed Aug. 8, 1924
1,558,588
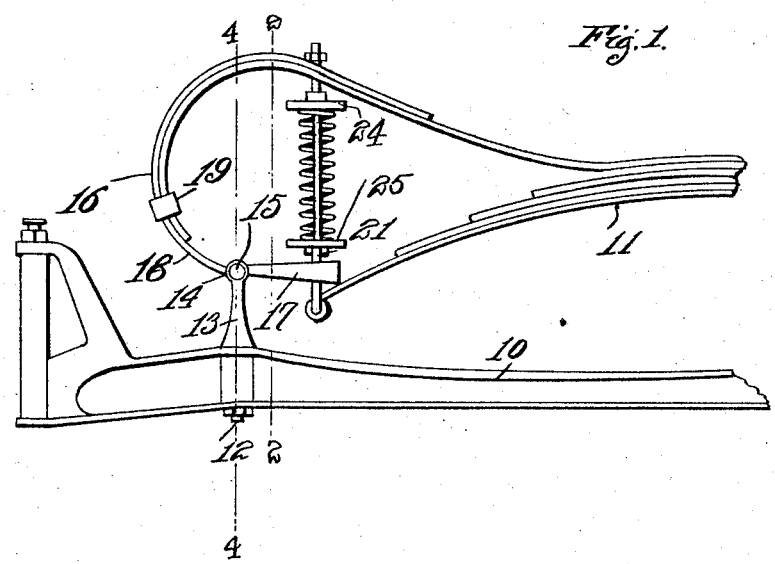
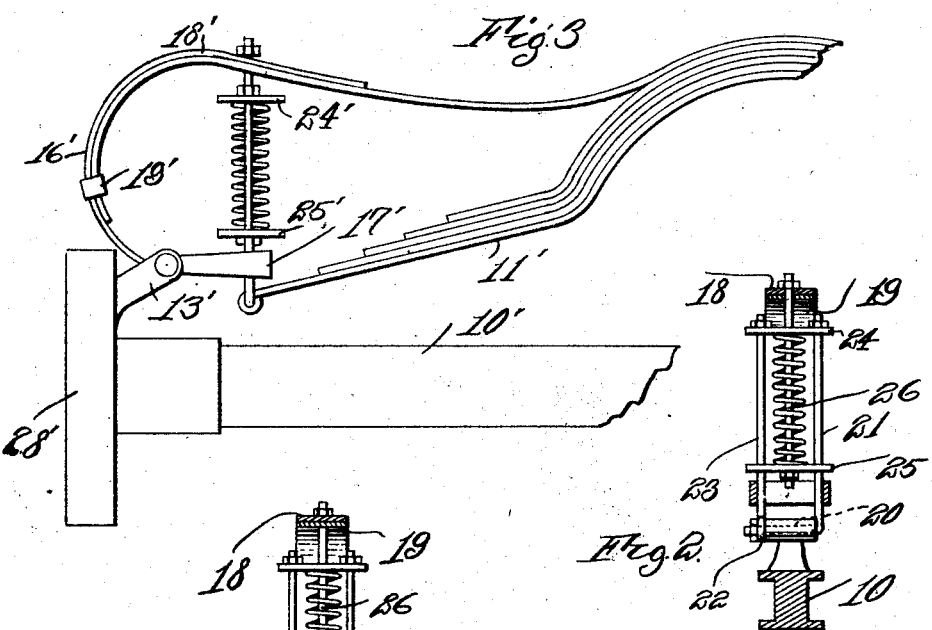
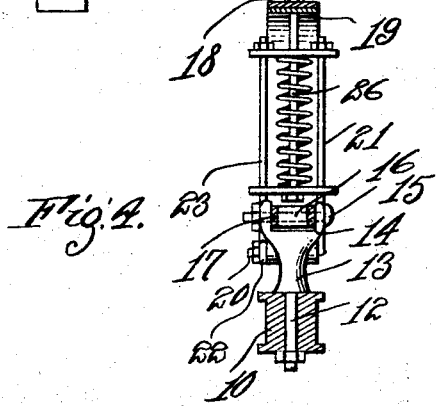
Inventor
Pearl G. Burdine.
By
Attorney Patented Oct. 27, 1925.

1,558,588

UNITED STATES PATENT OFFICE.

PEARL G. BURDINE, OF CHESTER, MISSISSIPPI.

SHOCK ABSORBER.

Application filed August 8, 1924. Serial No. 730,915.

*To all whom it may concern:*

Be it known that I, PEARL G. BURDINE, a citizen of the United States, residing at Chester, in the county of Choctaw, State of Mississippi, have invented certain new and useful Improvements in Shock Absorbers; and I do hereby declare the following to be a full, clear, and exact description of the invention, such as will enable others skilled in the art to which it appertains to make and use the same.

This invention relates to new and useful improvements in springs, and particularly to vehicle springs.

One object of the invention is to provide a novel and improved attachment for a vehicle spring, and especially the type of springs used on automobiles, whereby shocks and jars will be absorbed, and the breaking of the spring obviated.

Another object is to provide a shock absorber which includes means for preventing excessive side-play of the spring ends.

Other objects and advantages will be apparent from the following description when taken in connection with the accompanying drawing.

In the drawing:

Figure 1 is an elevation of one end of the front axle of an automobile, showing the invention applied thereto.

Figure 2 is a vertical transverse sectional view on the line 2—2 of Figure 1.

Figure 3 is an elevation of a portion of the rear axle of an automobile, showing the invention applied thereto.

Figure 4 is a vertical transverse sectional view on the line 4—4 of Figure 3.

Referring to the accompanying drawing, and particularly to Figures 1 and 2, 10 represents a portion of the front axle of an automobile, and 11 a portion of the spring thereof, said spring extending longitudinally above the axle, after the manner of certain types of automobiles now on the market. Disposed vertically through the axle, adjacent the end thereof, is a bolt 12, and formed on the upper end of the bolt, and extending above the axle, is a post 13, said post having its upper end bifurcated, as shown at 14, with the terminals of its furcations transversely apertured for the reception of the pivot pin or bolt 15. Disposed within the bifurcation 14 is the adjacent transversely apertured end of a spring leaf 16, and outwardly of the ends of the furcations are the apertured ends of the legs of the yoke 17, said pivot pin or bolt 15 being disposed through said apertured portions of the yoke, the furcations, and the spring leaf end. The said leaf spring 16 is curved and snugly fitted on the correspondingly curved end of the spring 18, which extends longitudinally of the main spring 11, and secured thereto by the bands or clips 19. The intermediate portion of this spring 18 is secured to the intermediate portion of the main spring 11, as clearly seen in Figure 1.

Disposed through the apertured end of the main spring 11 is the horizontal portion 20, of an L-shaped bolt 21, the other end of said horizontal portion being received in the eye 22 of the vertical bolt 23 disposed at the other side of the spring. The vertical leg of the bolt 21, and the stem of the bolt 23 are disposed vertically through openings in the vertically spaced plates 24 and 25, and secured to the former. A single bolt 26 is secured to the lower plate 25, and has its upper end slidable through the plate 24, a coil spring encircling this bolt 26 and bearing against the said plates 24 and 25.

It will be noted that the arms of the yoke 17 are disposed outwardly of the bolts 21 and 23, and in practical contact therewith, with the result that the main spring 11 is prevented from any great movement laterally of the axle, and its movements confined to a vertical plane.

The upper end of the bolt 26 is disposed through the spring leaves 16 and 18, while the lower ends thereof are connected with the end of the main spring 11, and due to the tension of the springs 16 and 18, the spring 27 will be held under tension, so that the rebound of the main spring 11 will be without jar or jerk, thus properly absorbing the shock thereof, and protecting the main spring, and the springs 16 and 18, from breakage.

Figure 3 shows the application of the device to the rear axle of an automobile, the parts being of the same construction as illustrated in connection with the first form, and all of the like parts being similarly designated except that the numerals are primed. The post 13 is inclined upwardly and inwardly from the brake drum 28.

What is claimed is:

1. The combination with the axle and main spring of a vehicle, of a post carried by the axle, a spring element having an end connected with the post and its intermediate portion connected with the main spring, a spring means between the end of the main spring and the said spring element, and means for engagement with the spring means for limiting the lateral movement of the main spring.

2. The combination with the axle and main spring of a vehicle, of a post carried by the axle, a bowed spring element connected with the upper end of the post and connected with the main spring, a spring shackle between the main spring and the bowed spring element, and a yoke carried by the post and engaging with the spring shackle whereby to prevent excessive lateral play of the main spring.

3. The combination with the axle and main spring of a vehicle, of a vertical post on the axle having its upper end bifurcated, a spring element intermediately secured to the main spring and having its end curved in the direction of the said post, a bowed spring member secured to the curved end of the spring element and having an end pivotally mounted in the bifurcated end of the post, a spring shackle pivotally connected with the end of the main spring and connected with the spring element and bowed spring member, and a yoke pivotally connected with the post and embracing the spring shackle.

In testimony whereof, I affix my signature.

PEARL G. BURDINE.